(12) United States Patent
Best et al.

(10) Patent No.: US 8,797,141 B2
(45) Date of Patent: Aug. 5, 2014

(54) REVERSE RFID LOCATION SYSTEM

(75) Inventors: Gregory C Best, San Francisco, CA (US); Andrew Ansell, Santa Clara, CA (US); Gwen Byard, Mountain View, CA (US); James W Jervis, Sunnyvale, CA (US); Jeffrey D Sanders, San Jose, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 549 days.

(21) Appl. No.: 12/544,869

(22) Filed: Aug. 20, 2009

(65) Prior Publication Data

US 2011/0043373 A1 Feb. 24, 2011

(51) Int. Cl.
*G08B 5/22* (2006.01)
*G01S 1/68* (2006.01)
*G01S 5/02* (2010.01)
*G06K 7/10* (2006.01)
*G01S 5/00* (2006.01)

(52) U.S. Cl.
CPC ............ *G01S 1/68* (2013.01); *G01S 5/0009* (2013.01); *G01S 5/02* (2013.01); *G06K 7/10049* (2013.01)
USPC .......................................... 340/8.1; 340/572.1

(58) Field of Classification Search
USPC ............... 340/1.1, 10.1–10.6, 572.1–572.9; 235/375–385
See application file for complete search history.

(56) References Cited

U.S. PATENT DOCUMENTS

| | | | |
|---|---|---|---|
| 4,688,026 A * | 8/1987 | Scribner et al. ................ | 235/385 |
| 5,422,816 A | 6/1995 | Sprague et al. | |
| 5,552,772 A | 9/1996 | Janky et al. | |
| 5,568,119 A | 10/1996 | Schipper et al. | |
| 5,892,454 A | 4/1999 | Schipper et al. | |
| 5,936,572 A | 8/1999 | Loomis et al. | |
| 6,046,683 A * | 4/2000 | Pidwerbetsky et al. ....... | 340/10.4 |
| 6,181,253 B1 | 1/2001 | Eschenbach et al. | |
| 6,282,540 B1 * | 8/2001 | Goldensher et al. .......... | 707/724 |
| 6,430,416 B1 | 8/2002 | Loomis | |
| 6,944,542 B1 | 9/2005 | Eschenbach | |
| 6,963,282 B1 * | 11/2005 | Yeates et al. ................ | 340/572.4 |
| 6,995,673 B1 * | 2/2006 | Osredkar et al. ............ | 340/572.1 |
| 7,132,932 B2 * | 11/2006 | Namm et al. ................. | 340/435 |
| 7,242,303 B2 | 7/2007 | Patel et al. | |
| 7,295,132 B2 | 11/2007 | Steiner | |
| 7,295,156 B2 | 11/2007 | Van Wyck Loomis | |
| 7,378,956 B2 | 5/2008 | Nam et al. | |
| 7,379,015 B2 | 5/2008 | Workman | |
| 7,397,381 B2 | 7/2008 | DiPiazza | |

(Continued)

FOREIGN PATENT DOCUMENTS

EP 1555541 A2 7/2005
JP 2005-189225 A 7/2005

(Continued)

OTHER PUBLICATIONS

Fu, Quing, et al., "Another Look Indoors GPS+RFID", GPS World, Mar. 2009.

(Continued)

*Primary Examiner* — James Yang
(74) *Attorney, Agent, or Firm* — NUPAT, LLC

(57) ABSTRACT

A reverse RFID location system is based on set of RFID tags in which each tag stores data representing its position.

27 Claims, 12 Drawing Sheets

(56) References Cited

U.S. PATENT DOCUMENTS

| | | | |
|---|---|---|---|
| 7,398,153 | B2 | 7/2008 | Workman et al. |
| 7,403,120 | B2 * | 7/2008 | Duron et al. ............... 340/572.1 |
| 7,403,853 | B1 | 7/2008 | Janky et al. |
| 7,420,510 | B2 | 9/2008 | Kolavennu |
| 7,551,126 | B2 | 6/2009 | Loomis et al. |
| 7,772,976 | B2 | 8/2010 | Christopher |
| 7,822,424 | B2 | 10/2010 | Markhovsky |
| 2005/0140507 | A1 | 6/2005 | Nam et al. |
| 2006/0092072 | A1 | 5/2006 | Steiner |
| 2006/0226970 | A1 * | 10/2006 | Saga et al. ..................... 340/506 |
| 2007/0120671 | A1 * | 5/2007 | Carmichael et al. ....... 340/572.1 |
| 2007/0139269 | A1 * | 6/2007 | Chen et al. ..................... 342/450 |
| 2008/0165003 | A1 * | 7/2008 | Graichen et al. ........... 340/572.1 |

FOREIGN PATENT DOCUMENTS

| | | |
|---|---|---|
| JP | 2006-266966 A | 10/2006 |
| JP | 2007-017375 A | 1/2007 |
| KR | 10-0838473 B1 | 6/2008 |
| WO | 2004-111776 A2 | 12/2004 |

OTHER PUBLICATIONS

Hesch, et al., "An Indoor Localization Aid for the Visually Impaired", 2007 IEEE International Conference on Robotics and Automation, Apr. 2007.

Office action in Chinese patent application No. 201080034870.0 (in Chinese) May 31, 2013.

Partial translation of office action in Chinese patent application No. 201080034870.0 May 31, 2013. Best and most complete translation available.

Translation of German patent office action in German patent application No. 112010003324.2, dated May 13, 2013.

Kodaka, et al., "Pose Estimation of a Mobile Robot on a Lattice of RFID Tags", 2008 IEEE/RSJ International Conference on Intelligent Robots and Systems, Nice, France, Sep. 22-26, 2008.

Willis, et al., "A Passive RFID Information Grid for Location and Proximity Sensing for the Blind User", University of Florida Technical Report No. TR04-009, http://www.cise.ufl.edu/tech_reports/tr04/tr04-009.pdf, 2009.

Renaudin et al., "Indoor Navigation of Emergency Agents", European Journal of Navigation, v. 5, n. 3, Jul. 2007.

Krigslund et al., "Orientation Sensing Using Multiple Passive RFID Tags", IEEE Antennas and Wireless Propagation Letters, vol. 11, 2012, p. 176-179.

Shirehjini et al., "An RFID-Based Position and Orientation Measurement System for Mobile Objects in Intelligent Environments", IEEE Transactions on Instrumentation and Measurement, vol. 61, No. 6, Jun. 2012, p. 1664-1675.

International Search Report and Written Opinion of the International Searching Authority in application PCT/US2010/046038, May 30, 2011.

* cited by examiner

REVERSE RFID LOCATION SYSTEM

TECHNICAL FIELD

The disclosure is generally related to navigation in places where the capabilities of global navigational satellite system (GNSS) receivers are limited, and to radio frequency identification (RFID) tags.

BACKGROUND

On Dec. 3, 1999, six firefighters were killed in a five-story blaze that roared through an industrial building in Worcester, Mass. Two of the firefighters went into the maze-like, brick structure to scout out flames shortly after the fire began. They radioed for help after becoming disoriented, and four others who went in to rescue them became trapped as well. In a separate incident in Kansas City, Mo., a fire department lost a battalion chief when he became lost and disoriented in a fire in a large paper warehouse. These stories and others offer dramatic examples of situations in which first responders need to know where they are indoors.

GNSS receivers, which are becoming ubiquitous in personal navigation systems, often do not work well indoors, in mines, under dense foliage, in shopping malls, in airport terminals, or in other situations where a clear view of satellites is blocked. Thus, alternate systems are needed for indoor navigation.

Reverse RFID location is a technique in which fixed locations in a building are tagged with RFID tags. A person with an RFID reader can read the tags to discover where he is. Existing reverse RFID systems rely on a database of RFID tag data. A mobile tag reader queries the database to provide location and other information associated with particular RFID tag ID numbers.

While existing reverse RFID location systems are promising, there is still much room for improvement.

DETAILED DESCRIPTION

The reverse RFID location system described here lets people find their way when GNSS or other positioning systems fail for lack of reliable signals. We use indoor positioning in an office building as an illustrative example; however, the systems and techniques described are equally applicable in warehouses, mines, under canopy in orchards, in shopping malls, airports or other environments. Of course, the reverse RFID location system is not restricted to areas of poor GNSS reception. On the contrary, reverse RFID location may be used wherever deployment of a set of RFID tags is possible, and RFID location may be integrated with GNSS or other navigation systems to provide smooth transitions between systems.

The reverse RFID location system provides several grades of service depending on what resources are available. Communication between a mobile RFID reader and a database of RFID tag information is not required for most services.

The location system is based on a set of RFID tags fixed in, for example, an office building or airport terminal. Basic tags contain small amounts of data; tags with 96-bit identification numbers are a popular standard, for instance. Each tag contains its position and may also contain vectors to other positions. A tag may contain the direction to a stairwell, or the direction and distance to a fire hose, as examples.

More advanced tags may contain larger amounts of data, from a few kilobytes to several megabytes or more. (Often, a tag's identification number is stored in 96, 128, or even 256 bits which are distinct from a larger user-memory area.) Such tags may incorporate, or be associated with, thermometers, gas sensors, or other physical sensors. Tags may contain maps, orchard layouts, airport terminal diagrams or other information. A scalable vector graphic (SVG) map may be generated from an extensible markup language (XML) file containing map data and possibly other tagged data.

A user of a reverse RFID location system finds his position from the positions of nearby RFID tags. The average position of the tags, weighted by signal strength, gives a useful user position estimate. Other data may be read from, or written to, tags. A user may write a message into a tag indicating when a tag was last visited and by whom, for example.

Figure 1:
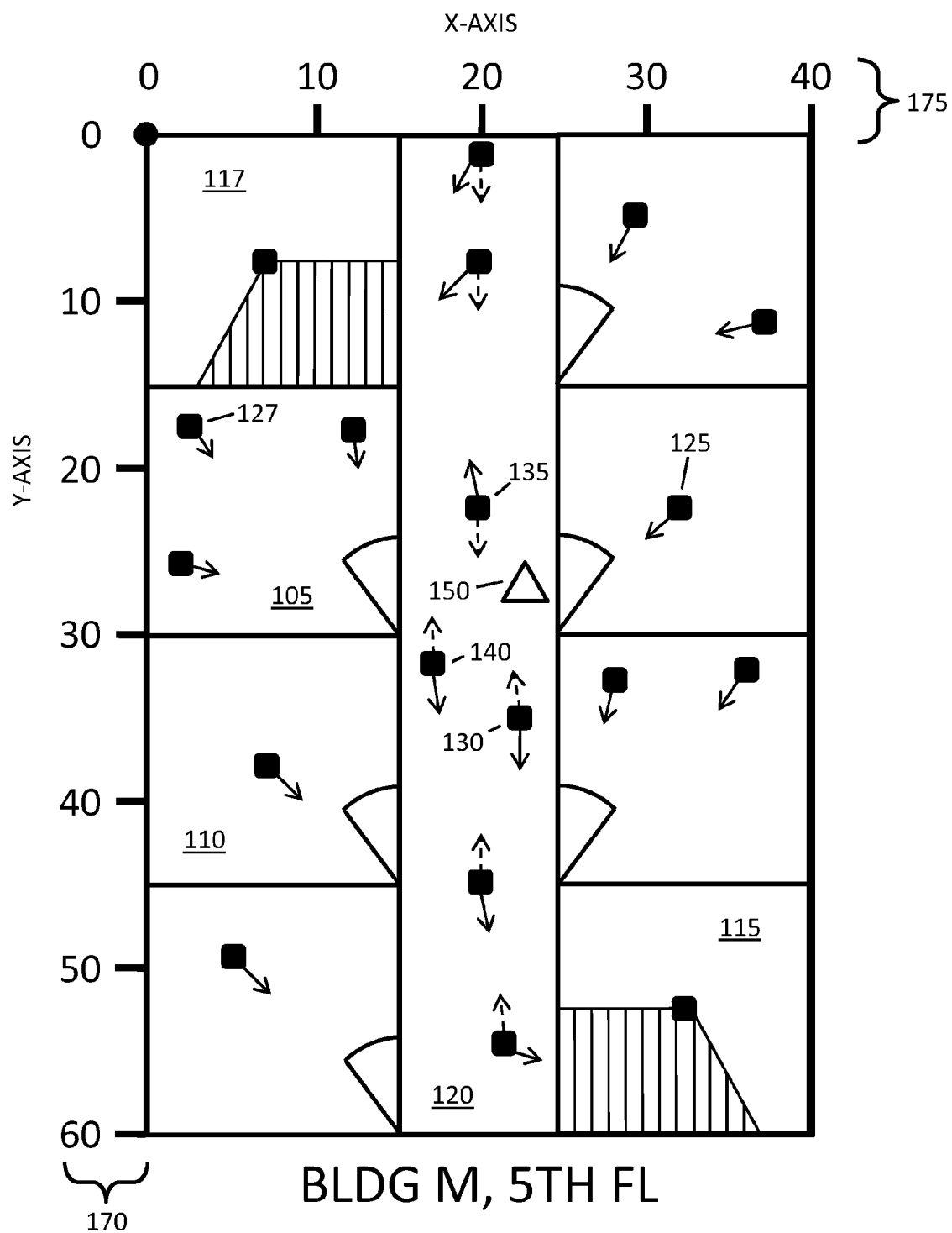
FIG. 1 is a floor plan showing rooms, hallways and stairwells in a building with RFID tags in various locations.

Turning now to the drawings, FIG. 1 is a floor plan showing rooms, hallways and stairwells in a building with RFID tags in various locations. The floor plan is for the fifth floor of building "M". The floor plan includes several rooms (e.g. 105, 110), two stairwells (115, 117) and hallway 120. RFID tags are located throughout (e.g. 125, 127, 130, 135, and 140). FIG. 1 also shows the position 150 of a mobile RFID tag reader, and a local coordinate system defined by y-axis 170 and x-axis 175.

The coordinate system may be used to specify locations on the floor whether or not a detailed floor plan is available. For example, the position 150 of a mobile RFID tag reader may be specified as (x,y)=(22,27) with or without knowledge that that position is near a doorway.

RFID tags 125, 127, 130, 135, 140, and others marked with similar symbols in FIG. 1 are located at convenient spots within the building. They need not be arranged in a regular array. It is useful to put tags along boundaries, e.g. near walls, whenever it is convenient to do so.

The RFID tags may contain one or more vectors to points of interest. Here "vector" includes direction only, distance only, or direction and distance. Tags 125 and 127 contain vectors pointing toward the exits of the rooms in which they are located. Tags 130, 135 and 140 contain vectors pointing toward stairwells 115 and 117. Tag 135 is closer to stairwell 117 than to stairwell 115. The solid arrow pointing away from tag 135 represents a vector to the nearest stairwell, while a vector pointing to the second nearest stairwell is shown as a dashed arrow. Thus tags can store multiple vectors pointing toward exits, fire equipment, or other points of interest. Tags 130 and 140 similarly point toward stairwell 115 (the closest stairwell to them) and toward stairwell 117. The vectors may contain direction or distance, or both, to a point of interest.

The positions of the tags and the directions and distances contained in vectors are represented in the local coordinates defined by axes 170 and 175. The local coordinate system simplifies positioning within the building. In general, a local coordinate system is one that is useful and relevant to a particular application. The coordinate system may be one-, two-, or three-dimensional (examples: linear (x), rectangular (x,y), 3D Cartesian (x,y,z), building (x,y, floor), polar (r,θ), spherical (r,θ,φ), etc.) Its origin may be chosen for convenience. In the example of a fire fighter navigating a building, it may be convenient to place the origin of a local coordinate system at the entrance to the building; that way one's position expressed in local coordinates conveys an immediate estimate of the distance to safety. For people using a navigation system on foot, appropriate units in a local coordinate system have a human scale; i.e. feet, meters, or yards rather than minutes of latitude, miles, or kilometers. For some users, such as surveyors, a global coordinate system (e.g. latitude, longitude, altitude) may be preferred.

In FIG. 1 the position of a mobile RFID reader is marked by triangle 150. The details of how the reader determines its whereabouts are presented below. For now, suffice it to say that the reader queries nearby tags as part of determining the reader's position. Each tag contains its own position expressed in the local coordinate system. Of course, each tag may contain much more data as well.

Figure 2A:
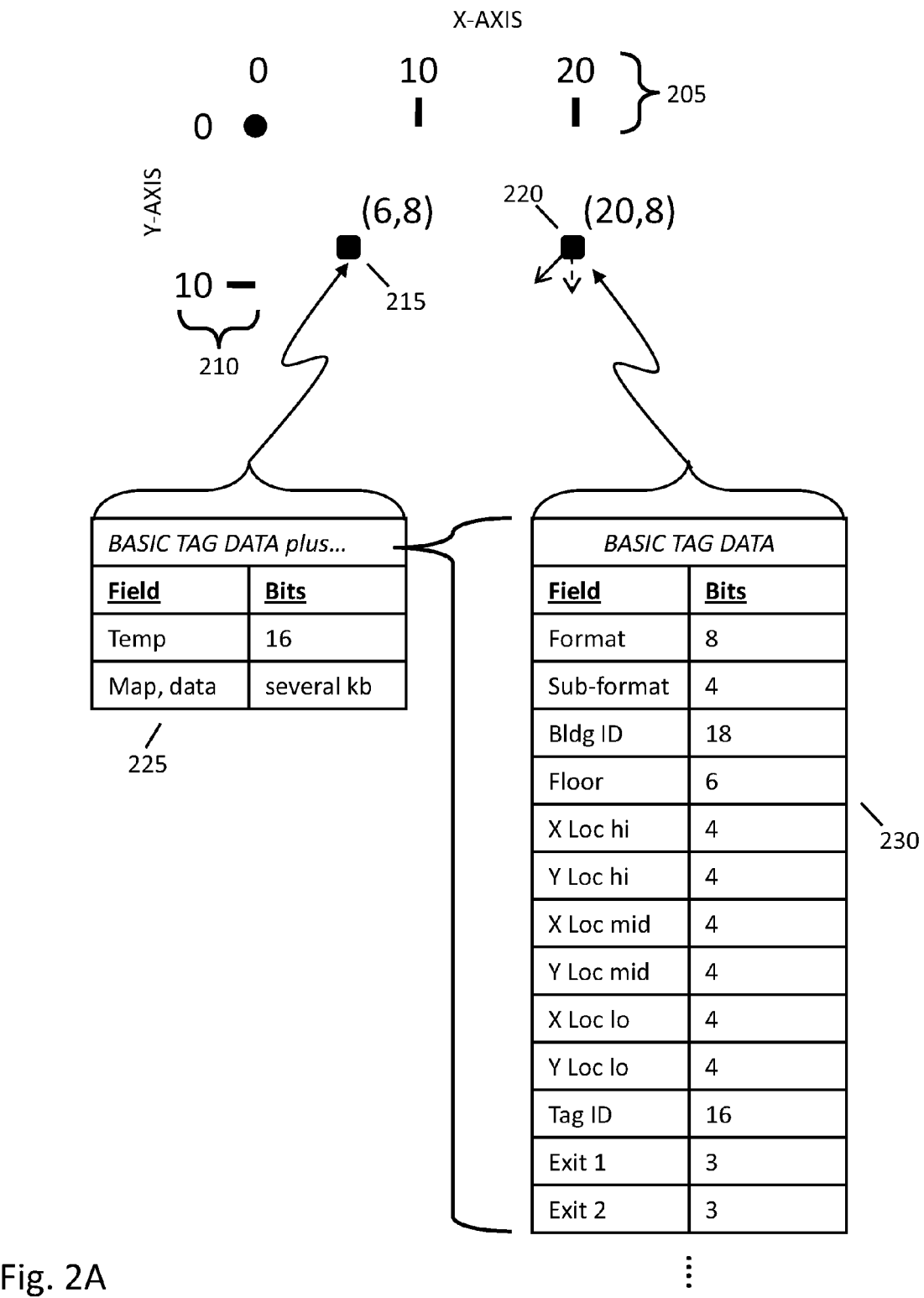
FIG. 2A shows an example of RFID tags located in a local coordinate system and examples of types of data contained by the tags.

FIG. 2A shows an example of RFID tags located in a local coordinate system and examples of types of data contained by the tags. In FIG. 2A, x-axis 205 and y-axis 210 define a local coordinate system. RFID tag 215 is located at (x,y)=(6,8) and RFID tag 220 is located at (x,y)=(20,8) in local coordinates. Tables 225 and 230 summarize types of data that may be contained in tags 215 and 220, respectively.

Many different types of RFID tag are available. Tags containing 96 bits of data (often thought of as an identification number) are popular currently, but tags capable of storing much more data in user memory areas are also readily available. Tags store their own positions as expressed in local coordinates whose origin lies in or near the building (or shopping mall, airport, etc.) in which the tag is placed. In a design that is most compatible with current tag interoperability standards, a tag's position is encoded as part of its 96-bit "identification" number.

Consider, for example, tag 220 which is located at (20,8) in the coordinate system of FIG. 2A. Table 230 summarizes the data contained in the tag. "Format" and "Sub-format" fields occupy 8 and 4 bits respectively and are used to define the data format standard with which the tag complies. (Note: Fields and bit sizes of those fields as shown in FIG. 2A are presented as non-limiting examples only.) "Building ID" and "Floor" fields (18 and 6 bits respectively) follow. Tags in FIG. 1 are identified with the fifth floor of building "M" at some geographical address, for example.

The next six entries in table 230 are, in order from more significant ("upper", "higher") to less significant ("lower") bits, "X Loc hi", "Y Loc hi", "X Loc mid", "Y Loc mid", "X Loc lo", and "Y Loc lo". These entries are for bits representing the tag's position in the X, Y coordinate system defined by axes 205 and 210. The X and Y entries are interleaved to improve the efficiency of an RFID reader in identifying nearby positioning tags.

An RFID reader sends out a query signal and waits for replies from RFID tags within range. But not all tags within range of a reader are of interest. Consider, for example, an RFID reader used for positioning a mobile user within a warehouse. Positioning tags may be distributed throughout the warehouse. However, many other tags may be present as well, with the most common example being tags attached to items stored in the warehouse. After all, the primary use of RFID tags today is to identify objects.

Mobile RFID readers may solicit replies from tags in any of several different ways. A typical approach is for the reader to send out a general query and then wait to see if any tags reply. If more than one tag replies, the reader may use various strategies to query progressively more restricted subsets of the space of all possible tags until only one tag replies. This way the reader is able to read tags sequentially and eliminate interference that might occur between simultaneous replies.

One way that a reader may narrow its queries is to solicit replies only from tags whose first N bits match a certain pattern. For example a reader may request that only tags matching a certain Format and Sub-format respond. If more than one tag matches the Format and Sub-format, the reader may solicit replies from tags whose first 2N bits match a certain pattern. This means that only tags having a certain Bldg ID and Floor (see FIG. 2A) will respond.

Figure 2B:
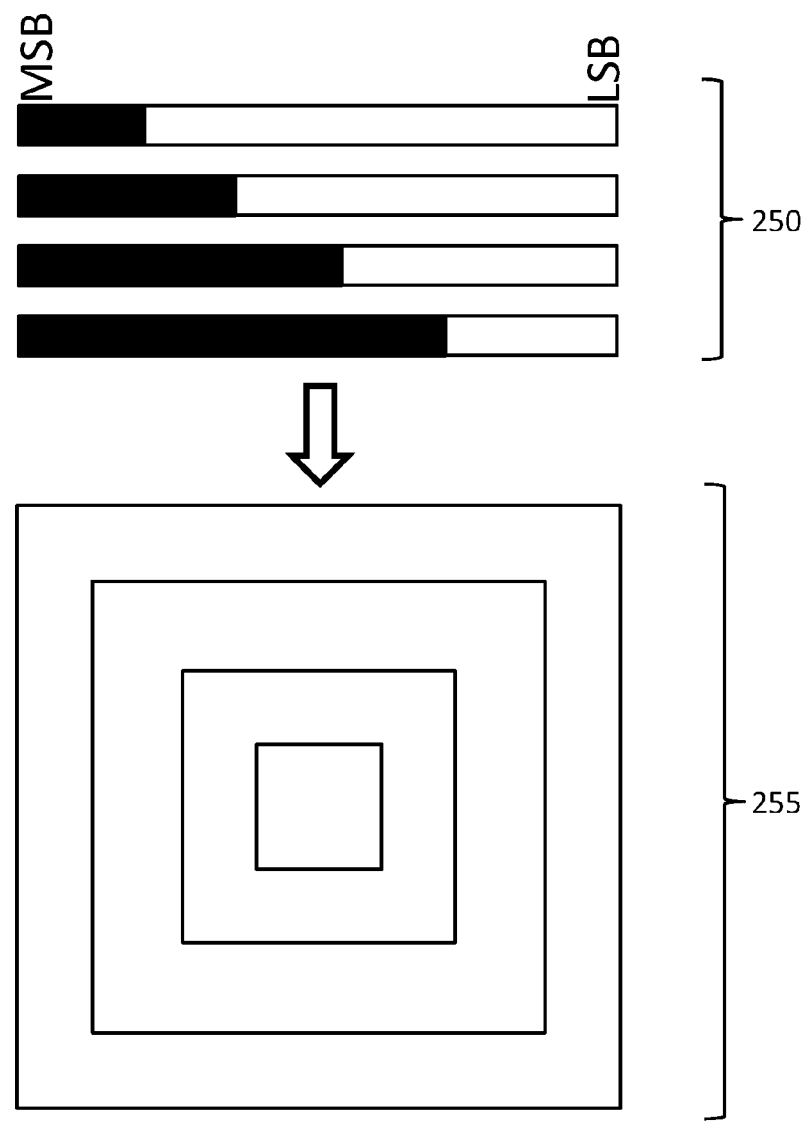
FIG. 2B illustrates a scheme for querying positioning tags in address space and real space.

FIG. 2B illustrates a scheme for querying positioning tags in address space and real space simultaneously. In FIG. 2B, bit diagrams 250 show addresses ranging from a most significant bit (MSB) to a least significant bit (LSB). Dark bits in the addresses are those that must match a query from a reader in order for a tag to respond. Boxes 255 represent progressively smaller volumes of real space corresponding to more and more specific bit addresses. This correspondence is a consequence of the interleaved position bits in table 230.

As a reader solicits replies from tags whose first M bits match a certain pattern it is effectively soliciting replies from tags located in a smaller and smaller region of real space. This successive bit masking technique lets a reader quickly focus on nearby tags. Coarser positioning is achieved in upper bits while fine positioning is achieved in lower bits. FIG. 2A illustrates the arrangement of bits in groups of four; however, X and Y location bits may be interleaved on a bit-by-bit basis: most significant X bit, most significant Y bit, next-most-significant X bit, next-most-significant Y bit, etc. In general, coordinates may be interleaved at any level of granularity (each bit, every other bit, every third bit, etc.). Different dimensions may be interleaved with different granularity. As an example, X and Y, but not Z, bits might be interleaved in an X, Y, Z system.

Interleaving position bits is useful when an available reader narrows its tag search by starting from more significant bits and working toward less significant bits as shown in FIG. 2B. However, a reader that could query arbitrary patterns of fixed and variable bits might change requirements for interleaved position bits. Such a reader could query tags based on their position directly. For example if position information were encoded in bits 64 through 79, a reader might send a query specifying that only tags in which bits 64-66 and 72-74 (which might be high bits of X and Y position) should send replies.

Returning to FIG. 2A, "Tag ID" is an optional, unique number (shown as 16 bits in the example of FIG. 2A) that further identifies a tag. "Exit 1" and "Exit 2" are examples of additional data stored in a tag. In this case, they are vectors to nearby exits in a building.

Table 225 summarizes the data contained in tag 215 at position (6,8). This tag contains data in the same format as that of tag 220, plus additional data: "Temp" and "Map, data". These are examples of other data that may be stored in a tag such as the temperature of the tag or a map of the local surroundings. This additional data is usually stored in a tag's user memory. A map stored in a tag may take the form of an XML file that contains data for an SVG map and metadata such as labels for items in the map. It may be useful to place tags containing maps or floor plans near the entrance to each floor in a building, for example.

Vectors to points of interest (e.g. exits, fire hoses, information kiosks, bathrooms, etc.), temperature readings, annotated maps, and data from sensors (e.g. gas concentration, radioactivity, strain, etc.) are just a few examples of information that may be stored in tags. Furthermore, RFID "readers" may also be RFID writers; they may store information in nearby tags. As an example, an RFID reader carried by a firefighter can store information in a tag indicating when the firefighter was last located near the tag. Another firefighter can then use an RFID reader to follow the first firefighter's path.

Thus, the types of data stored in an RFID tag are limited only by the memory capacity of the tag. Tags may be both read from and written to by RFID "readers" which include the ability to be RFID writers as well. However, in a typical application most of the tags store their position and a few other bits of data such as vectors to points of interest. Therefore we turn now to different grades of positioning service that may be provided by a reverse RFID location system and how position may be determined by RFID readers.

Figure 3A:
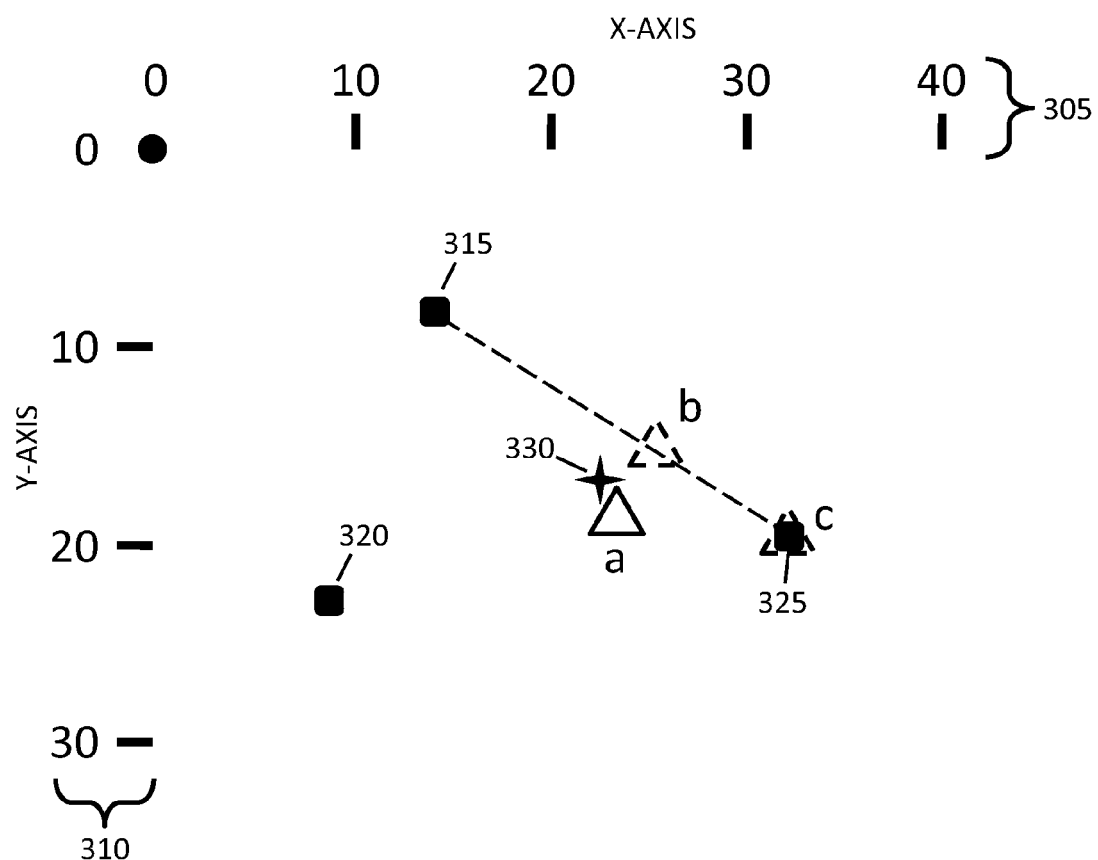
FIG. 3A is a diagram showing various position fixes obtained with reverse RFID techniques.
Figure 3B:
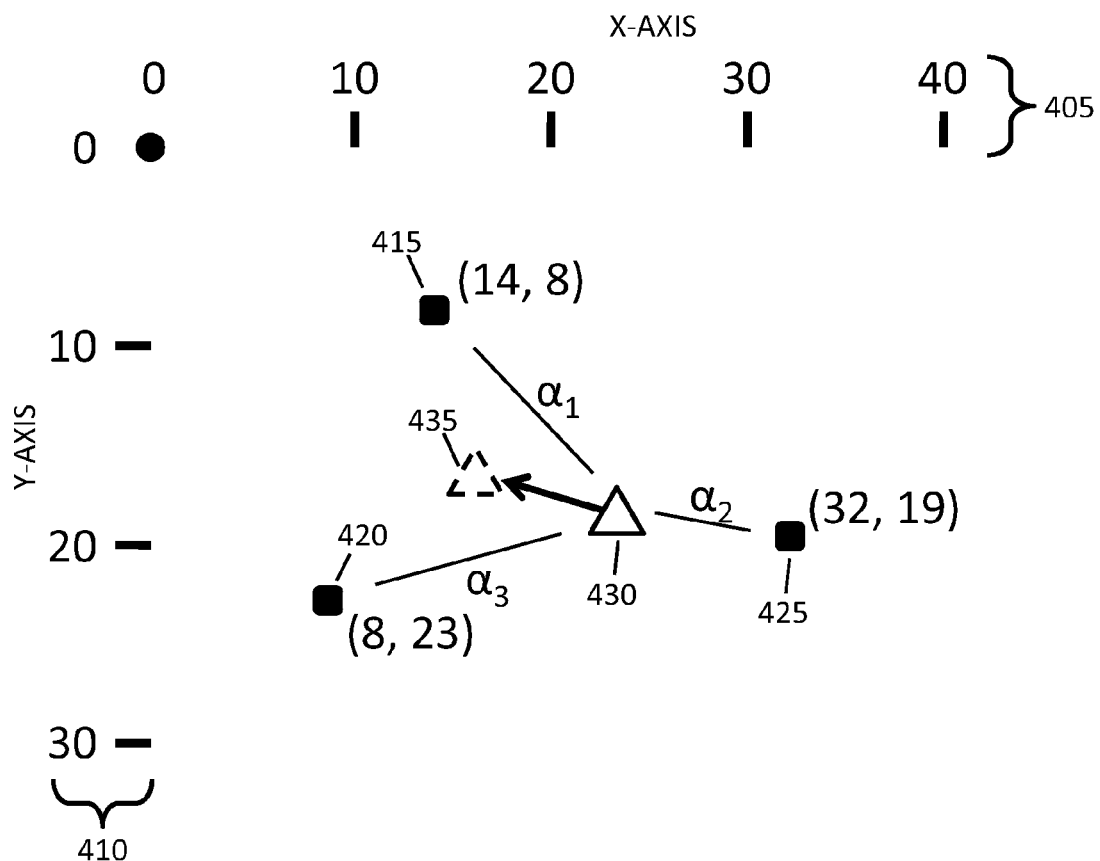
FIG. 3B is a diagram showing how position and velocity may be determined based on weighted averages of RFID tag locations.

FIG. 3A is a diagram showing various position fixes obtained with reverse RFID techniques. FIG. 3B is a diagram showing how position and velocity may be determined based on weighted averages of RFID tag locations.

In FIG. 3A x-axis 305 and y-axis 310 define a local coordinate system in which RFID tags 315, 320 and 325 are located. The estimated positions of an RFID reader under different levels of service are represented by triangles "a", "b" and "c". The true position of the reader is marked by four-point star 330. The simplest and crudest position estimate is obtained by assuming that the position of an RFID reader is the same as that of a nearby RFID location tag. Although this estimate almost never gives the correct reader position (i.e. true position 330), it is often useful—"good enough" for many applications. In FIG. 3A such an estimate is represented by triangle "c" which is superimposed on the location of tag 325.

A better position estimate is obtained when a reader can determine that its location lies on a line between two tags. In FIG. 3A such an estimate is represented by triangle "b" which lies on a straight line connecting tags 315 and 325. The reader's position along such a line, i.e. how far it is from each end, may be estimated by measuring return signal strength using techniques described below.

Triangle "a" represents a still better estimate of reader position that lies between tags 315, 320 and 325. Although FIG. 3A shows only two dimensions, X and Y, inter-tag positions such as position estimate "a" may be obtained in three dimensions and may rely on replies from three or more RFID tags. When four or more tags are available, three-dimensional positioning is more robust if the tags do not all lie in the same plane.

Turning now to FIG. 3B, x-axis 405 and y-axis 410 define a local coordinate system in which tags 415, 420 and 425 are located at positions (14,8), (8,23) and (32,19) respectively. Triangles 430 and 435 represent position estimates for an RFID reader. Position estimate 430 is calculated by a reader from a weighted average of positions of nearby RFID tags. Received signal strength, or a function of the received signal strength (e.g. log, square, etc.), determines the weighting factors which are normalized before being applied to tag positions.

In this example, weighting factor $\alpha_1$ is applied to the position of tag 415 while factors $\alpha_2$ and $\alpha_3$ are applied to the positions of tags 420 and 425. For example, an RFID reader at position 430 might determine that $\{\alpha_1, \alpha_2, \alpha_3\}=\{0.285, 0.453, 0.262\}$. The reader's estimated position is then $\{\alpha_1(14,8)+\alpha_2(32,19)+\alpha_3(8,23)\}=(21,17)$ where the reader obtained the position of each tag from the tags' replies to the reader's query. This simple method of averaging tag positions to find reader position is robust, simple and reasonably accurate.

An RFID reader's position may also be obtained by other methods. For example, received signal strength may be used to estimate the distance to tags and the reader's position then estimated by trilateration in analogy to GNSS. However, in practice received signal strength from tags may be noisy and matrix calculations to determine position using trilateration are more complex than the simple averaging method described above.

Positioning by weighted average of tag positions is enhanced by various techniques. First, only nearby tags answer reader queries because the reader solicits tags with high bits matching an approximate position and then focuses on the low bits of nearby tags as described above in a discussion of interleaved X and Y position bits. Nearby tags may be queried multiple times to improve accuracy if the query rate is fast compared to the motion of the reader.

A reader may determine the quality (i.e. estimated accuracy) of an estimated position. Position quality is affected by factors such as signal to noise ratio of received signals, number of nearby tags, and geometric arrangement of nearby tags. Positions estimated from a set of tags nearly aligned in a straight line may not be as accurate as those estimated from tags spread out in two or three dimensions, for example.

A reader's speed and direction of travel may be estimated from successive position fixes. For example, if a reader moves from position 430 to position 435 in FIG. 3B, its speed may be estimated by dividing the distance between estimated positions by the time taken to travel from one to the next.

The technique of polling tags that are nearby both in real space and in the address space of their data bits (taking advantage of interleaved X and Y position bits) may be extended further by discriminating in time as well. As an example, a reader may use data only from those tags that were queried most recently. A time threshold may be set such that replies from tags that occurred longer ago than the time threshold are ignored. Time thresholds ranging from about 0.5 up to about 5 seconds are useful for positioning in an office building but time thresholds of other durations may also be used. The time threshold may be tuned as a reader changes speed; the faster a reader is moving, the shorter threshold that is appropriate. When a tag replies more than once during a time threshold its replies may be combined, or only the most recent reply may be taken into account depending on the application.

Figure 4A:
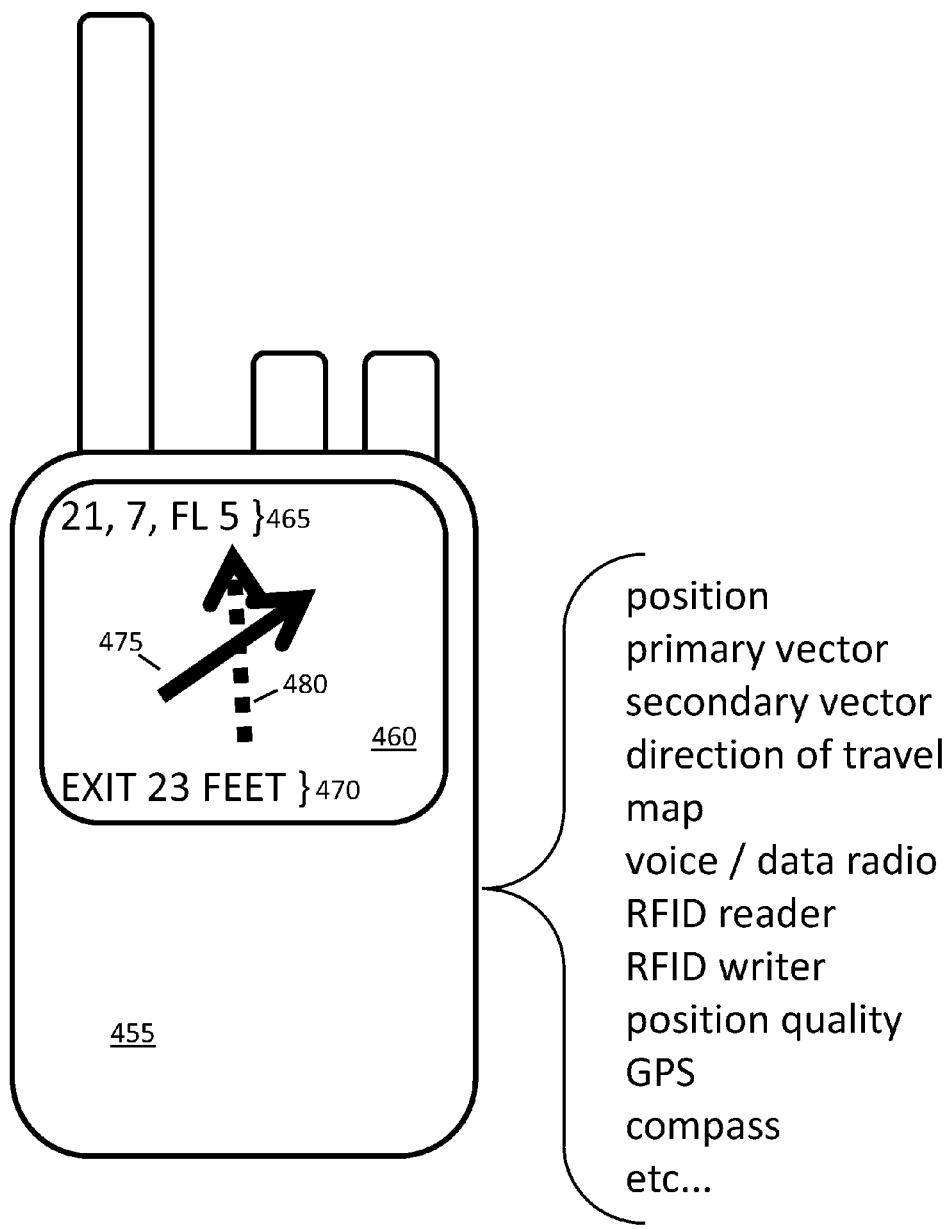
FIG. 4A shows an example of a mobile RFID reader.

FIG. 4A shows an example of a mobile RFID reader. Such readers may come in a wide variety of shapes and sizes and may be combined in units that perform many other functions besides reading RFID tags. In FIG. 4A mobile RFID reader 455 includes display 460 which may be, for example, a simple, one-line text display, a two-dimensional color LCD, a touch screen, etc. RFID modules, displays, and packaging are commercially available; however, firmware and software required to implement reverse RFID positioning are not.

Figure 4B:
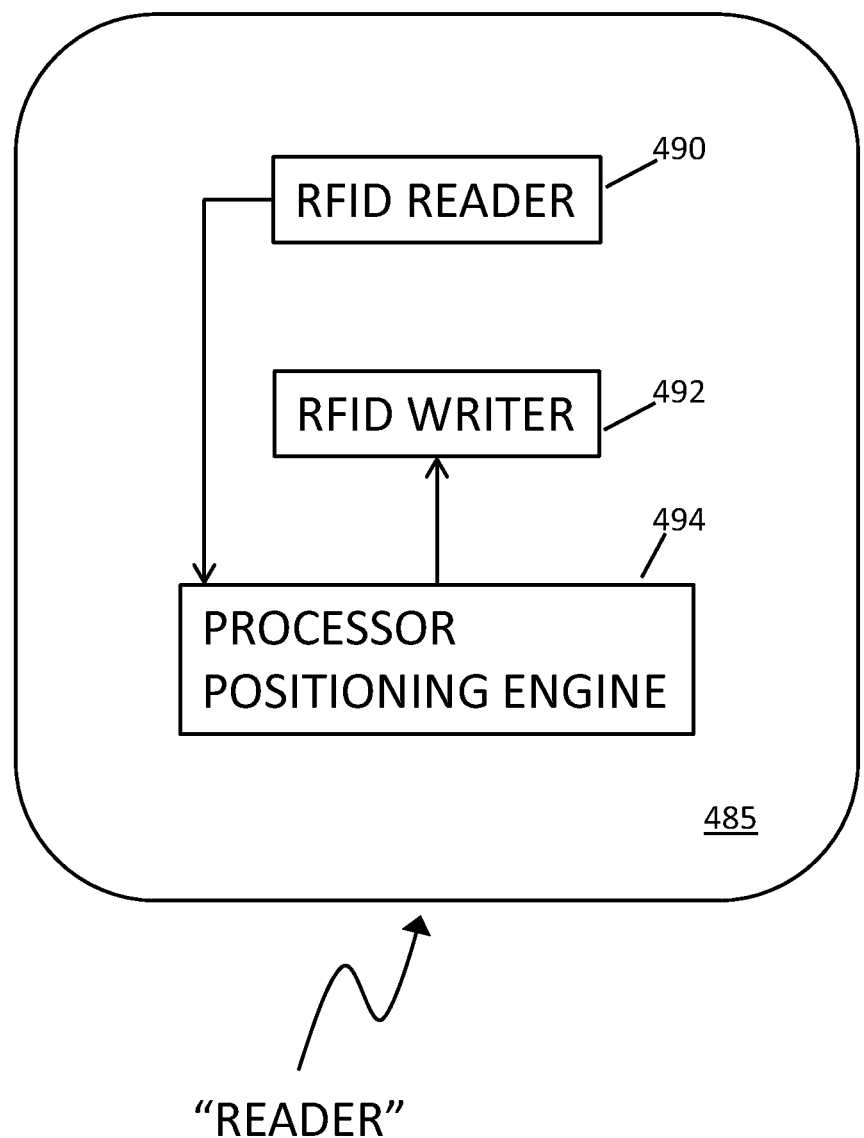
FIG. 4B is a block diagram of systems contained in an RFID "reader".

FIG. 4B is a block diagram of systems contained in an RFID "reader". Throughout this application, "reader" may refer to an integrated device such as reader 485 which contains an RFID reader 490, an optional RFID writer 492, and a processor/positioning engine 494. The output of RFID reader 490 is a stream of tags' data with corresponding signal strengths. Processor/positioning engine 494 is required to convert the output of RFID reader 490 into position information or to perform more advanced functions.

Display 460 may show a user his position as coordinates in a local coordinate system; e.g. "21, 7, FL5" (item 465) which is interpreted as (x,y)=(21,7) on the fifth floor of a building. Alternatively the display may show a map with the user's position marked on it in a fashion similar to existing GNSS receiver map displays.

Display 460 may also show a user the location of points of interest (e.g. exits, stairwells, information kiosks, etc.) in several ways, the simplest being a text readout such as "EXIT 23 FEET" (item 470) that shows how far away the point of interest is. In addition, or alternatively, the display may show arrows (e.g. 475, 480) that show the way to points of interest. For example, the reader of FIG. 4 placed in the environment of FIG. 1 could show the direction to each of the nearest two exits with a solid arrow pointing to the nearest and a dashed arrow pointing to the second nearest.

Thus the mobile device of FIG. 4A may provide functions including: reverse RFID derived position, vectors to primary and secondary points of interest, direction of travel, map of local surroundings optionally annotated with metadata, voice and/or data radio link, general RFID read/write capabilities, position quality estimates and displays of position quality (e.g. green for high accuracy, red for low accuracy), GNSS receiver, magnetic compass, etc. Which and how many of these and other functions are included in a particular device depends on the user and the application. A system designed for firefighting in low visibility might include different features from one designed for bargain hunting in a shopping mall. A system designed for use in low visibility or by blind people might include an audio or tactile interface rather than display 460. The duration, repetition rate, or frequency of audible beeps could indicate the distance to a point of interest such as a building exit, for example. Speech recognition and speech synthesis systems could provide an oral/aural interface. Vibrating transducers placed on different parts of the body may be used to indicate direction. Tactile interfaces may also include devices that apply variable pressure with blunt pins, or that squeeze. Finally, a reader designed to be integrated into a larger system might not have any human interface at all.

Figure 5:
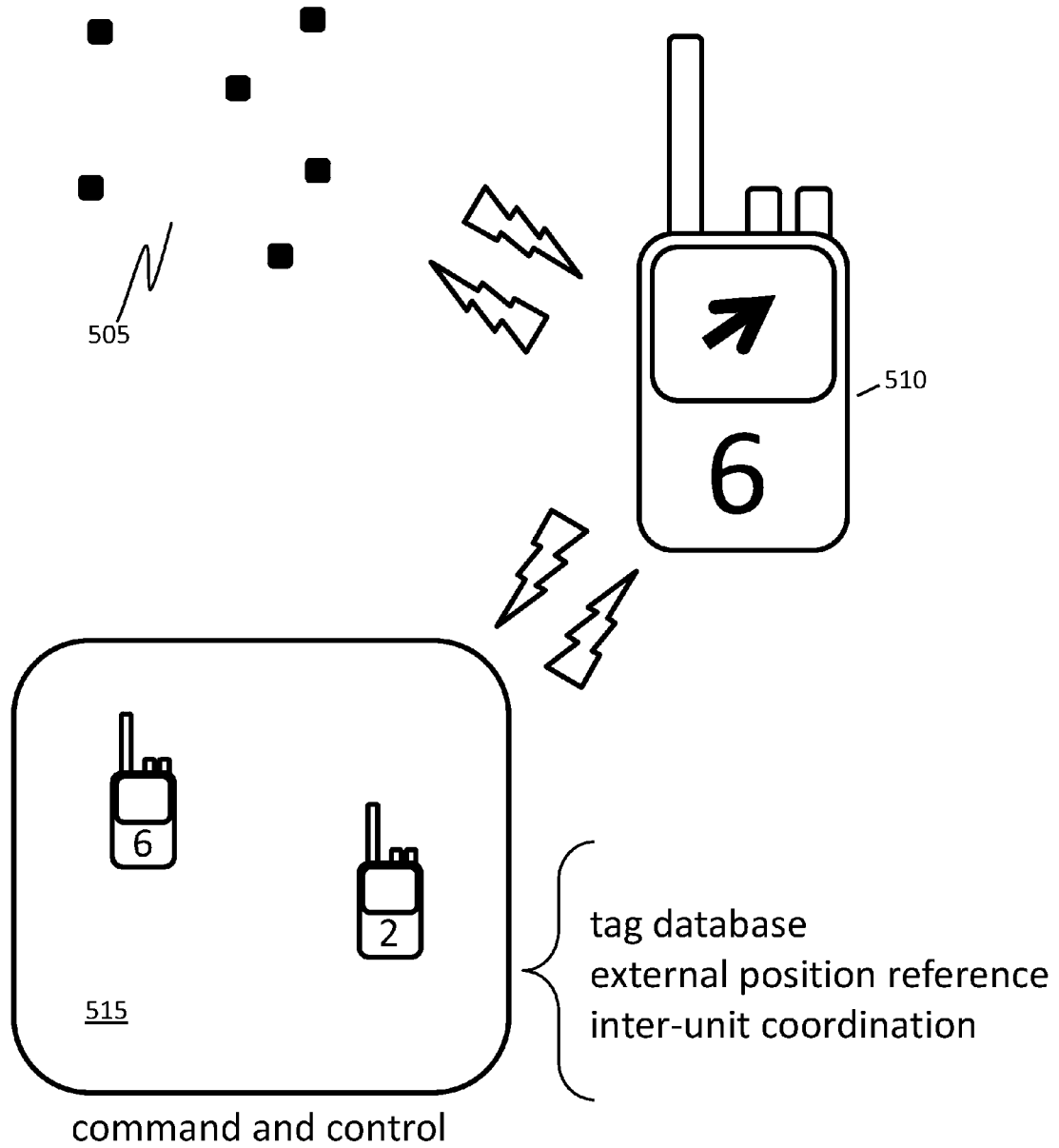
FIG. 5 shows a system containing a set of RFID tags, a mobile RFID reader, and an optional command and control unit.

FIG. 5 shows a system containing a set of RFID tags 505, a mobile RFID reader 510, and an optional command and control unit 515. RFID tags 505 are distributed in an area in which mobile RFID reader 510 may navigate. Optional command and control unit 515 provides optional services such as keeping track of the location of multiple mobile RFID readers, providing optional database services to the mobile readers, and providing optional computational services to the mobile readers. The command center may provide detailed maps of the location of various readers and the history of their movements.

In a typical system, mobile readers (such as reader 510) may communicate with each other via data or voice radio links. The mobile readers do not need to communicate with a command center to find their position. Each tag in the set of tags 505 stores its position internally and mobile readers determine their positions based on nearby tags' positions.

Figure 6:
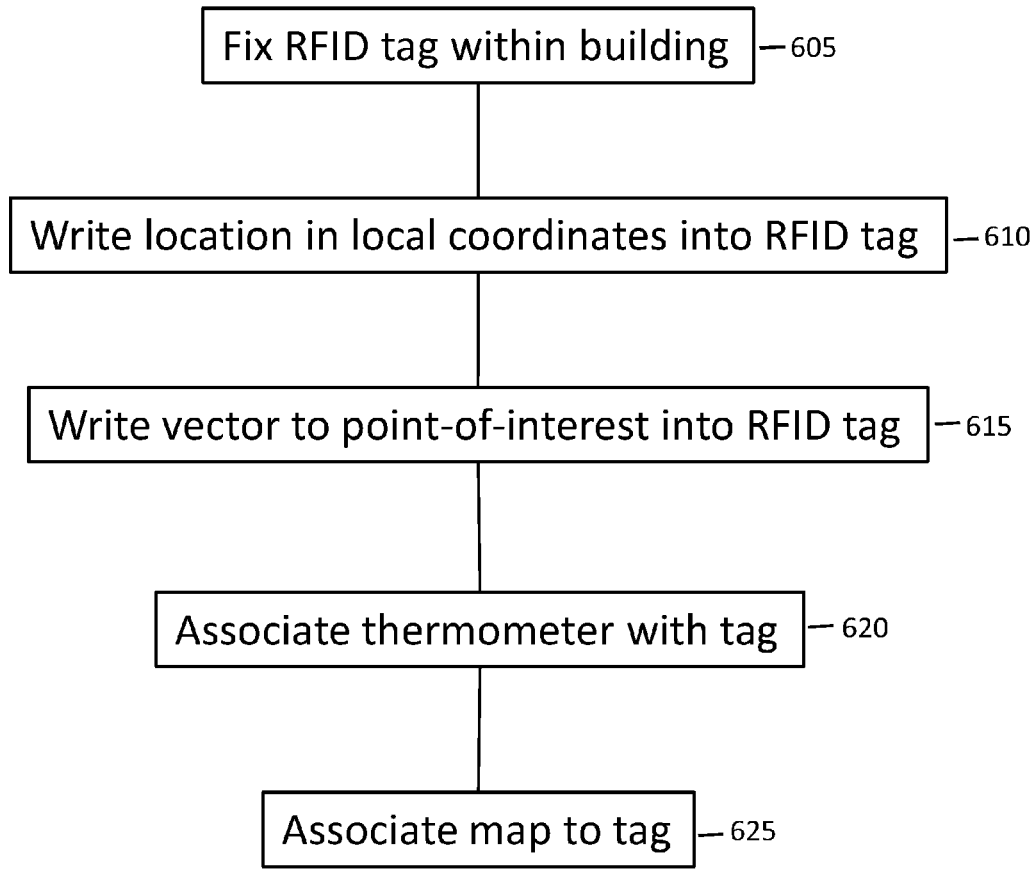
FIG. 6 is a flow chart for setting up a reverse RFID location system.

FIG. 6 is a flow chart for setting up a reverse RFID location system. Steps 605 (fix RFID tag within a building or other area) and 610 (write location of tag in local coordinates into RFID tag) are required, but need not be completed in a particular order. Steps 615 (write vector to point of interest into a tag), 620 (associate a thermometer or other sensor with a tag) and 625 (associate a map with a tag) are optional and may be performed in any order. All that is needed to prepare an area for reverse RFID navigation is to distribute RFID tags throughout the area and write the location of each tag into its memory. As discussed above, tags may contain only their position or may also contain many other data such as vectors to points of interest, sensor readings, maps, etc.

Examples of places where tags may be located (step 605) include: ceiling tiles, carpet, sprinkler heads, embedded in concrete, in switch plates, etc. Tags integrated in ceiling tiles or carpet (as examples) offer a convenience when locations are written into them as their installed spacing is predetermined. Thus the job of figuring out what data to write in each tag is speeded up.

Figure 7:
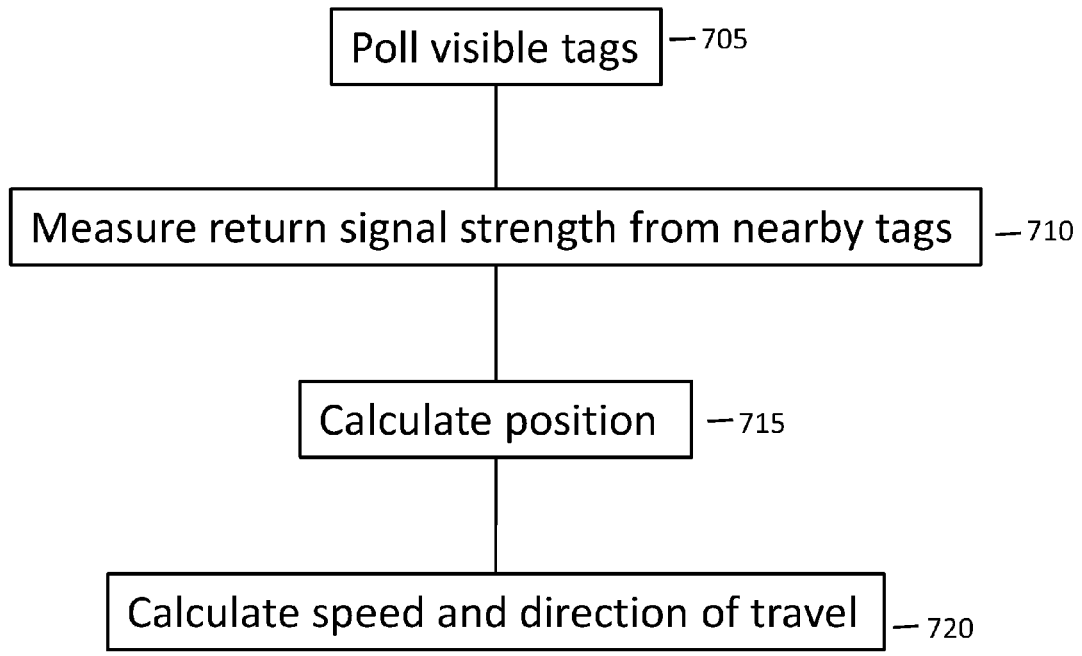
FIG. 7 is a flow chart for a mobile RFID reader finding its position and velocity.

FIG. 7 is a flow chart for a mobile RFID reader finding its position and velocity. After step 705, the remaining steps outlined in FIG. 7 may be performed in any order. In FIG. 7, step 705 is "poll visible tags"; step 710 is "measure return signal strength from nearby tags"; step 715 is "calculate position"; and step 720 is "calculate speed and direction of travel".

Step 705, polling visible tags, means receiving signals from RFID tags in the vicinity of the reader. When a system of tags that have X and Y location bits interleaved is used, the tag address range that must be searched to find all local tags is minimized. The signal strength returned from nearby tags in response to an interrogation signal is measured in step 710. (Step 710 is optional as not all positioning methods depend on knowledge of return signal strength.)

A mobile RFID reader calculates its position in step 715 based on tag location information obtained from nearby tags. This calculation may be performed in one or more of several ways. One method of finding position is to use returned signal strength as a measure of distance from an RFID tag. Given distances from several tags and the tags' positions, the position of the reader may be determined by trilateration (or, more generally, multilateration). If the system is overdetermined a least squares approach (or weighted least squares, weighted by signal strength) may be used to find a position estimate.

A second method is to calculate the average position of tags from which signals are returned weighted by a function of the returned signal strength, s. The weighting function, $f(s)$ may be square (i.e. $f(s)=s^2$), square root, log, exponential, $f(s)=s$, a function of estimated path loss, antenna characteristics, noise statistics or environment, or another function. Weighting measurements to find three-dimensional position from four tags, for example, is accomplished by calculating $(x,y,z) = \{f(s_1)(x_1,y_1,z_1) + f(s_2)(x_2,y_2,z_2) + f(s_3)(x_3,y_3,z_3) + f(s_4)(x_4,y_4,z_4)\} / \{f(s_1) + f(s_2) + f(s_3) + f(s_4)\}$.

A third method is to ignore signal strength (i.e. set $f(s)=1$ in the example above) and perform a simple average. This method eliminates the need to measure signal strength.

A fourth method is to find the median position reported by positioning tags within range. The median may be calculated as the middle most tag, or the position defined by the middle most X coordinate, the middle most Y coordinate and the middle most Z coordinate.

A fifth method is to use the position half way between the two farthest apart tags among those within range of the reader. This method may also be performed on a coordinate by coordinate basis, e.g. by finding extremes in X, Y, and Z independently. Optionally, signal strength may help determine which tags are the farthest away.

A sixth method is to pick the position of a responding positioning tag at random. This could be the first tag to respond to a reader query, for example. This method is adequate as long as the desired positioning accuracy is greater than the range of the reader. Reader range may be reduced to improve the accuracy of this method and range may even be adjusted on the fly to reduce the number of responding positioning tags. Once a tag is chosen, the reader's position may be estimated as the tag's position until the reader goes out of range of the tag. If return signal strength information is available, then instead of picking a tag at random, the tag with the strongest return signal may be chosen.

Random sample consensus may be used to reduce the effect of outliers in tags' reported positions. For example, if one tag reports a position outside the expected range of tag visibility, then its position may be discounted in a reader position estimate.

Additional methods include soliciting tag responses in regions of address space (i.e. soliciting only tags whose address bits match a certain pattern) or in time (i.e. basing a calculation on only on responses received within the most recent time interval, t). There are a great variety of possible ways to combine positions reported by RFID positioning tags in order to generate a RFID reader position estimate. Of those just described, a subset (multilateration, averaging, median, mid-point), may be grouped as ways of aggregating positions reported by two or more radio frequency identification tags, while others (random tag, first tag, strongest signal) assume the reader's position is the position of a tag.

Finally calculating speed and direction of travel (720) are optional but may be accomplished by comparing the position of a mobile reader at different times. Speed may be obtained by dividing the distance between measured positions by the time between those positions, while direction may be calculated from vector difference of the positions.

Figure 8:
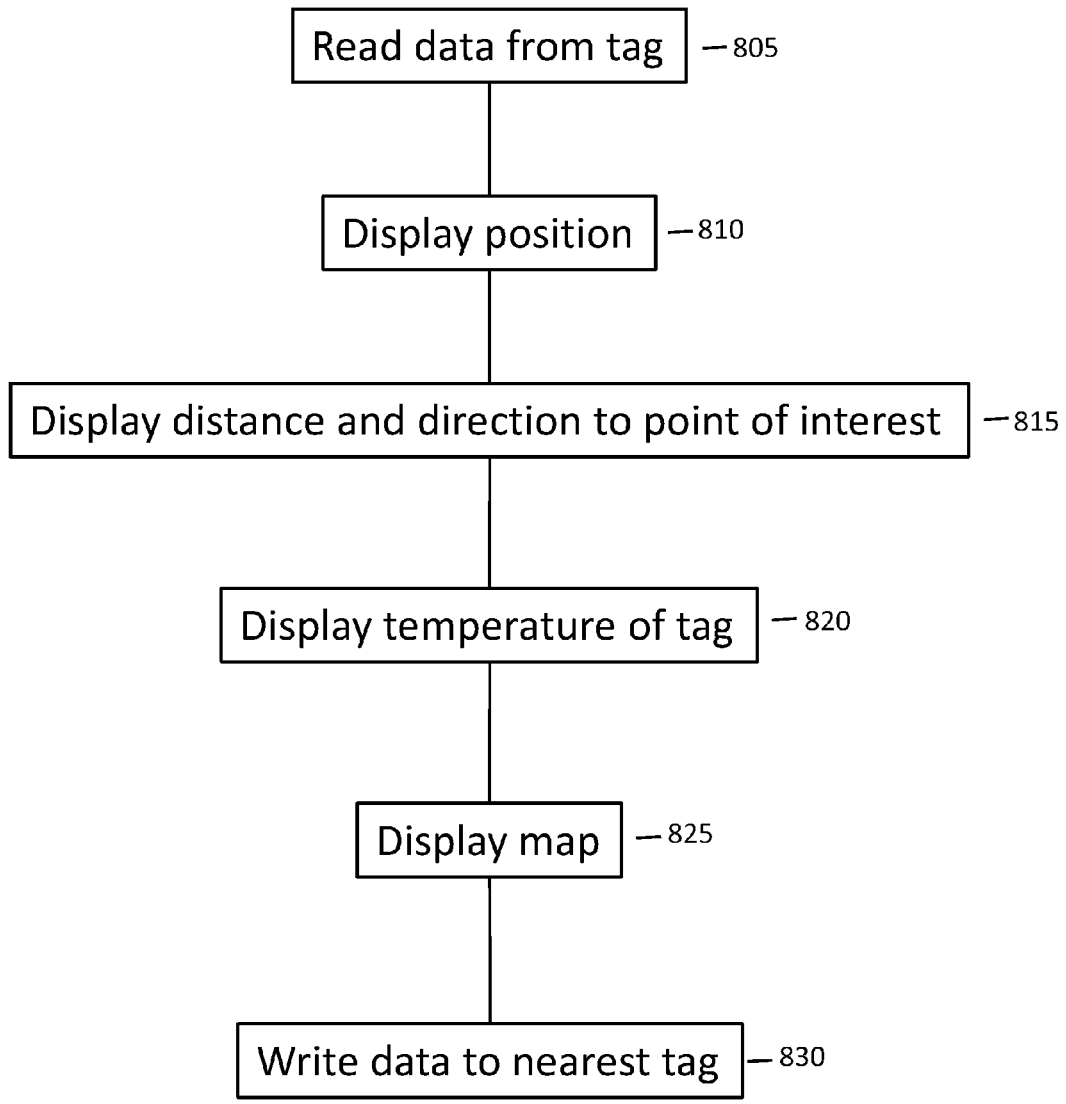
FIG. 8 is a flow chart for a mobile RFID reader retrieving and displaying data from nearby RFID tags.

FIG. 8 is a flow chart for a mobile RFID reader retrieving and displaying data from nearby RFID tags. The steps outlined in FIG. 8 may be performed in any order including skipping any of the steps. In step 805 a mobile RFID reader reads data from an RFID tag. As described above the data may be as simple as the position of the tag, or as complex as an XML file containing instructions for an SVG map and embedded metadata. In step 810 the reader displays its position in textual or graphic form. The reader may also emit an aural or visual signal when it is located at a predetermined spot. For example, a reader may sound a chime when it nears an exit in an office building.

In step 815 a mobile reader displays the distance and/or direction from the reader to point of interest such as an exit, stairwell, escalator, etc. In step 820 a mobile reader displays the temperature of a tag as reported by the tag to the reader. Of course, temperature is just one example of sensor data that may be stored in an RFID tag. In step 825 a mobile reader displays a map downloaded from an RFID tag. In one deployment of a reverse RFID location system, tags near the entrances of a building include map data so that maps or floor plans of the building are made available to first responders as they enter the building. In step 830 a mobile RFID reader/writer writes data to the nearest tag. For example, the reader may write data indicating when it last visited the tag. RFID readers can then follow each other's progress by querying tags to find out the identity of recent visitors to a tag location.

Figure 9:
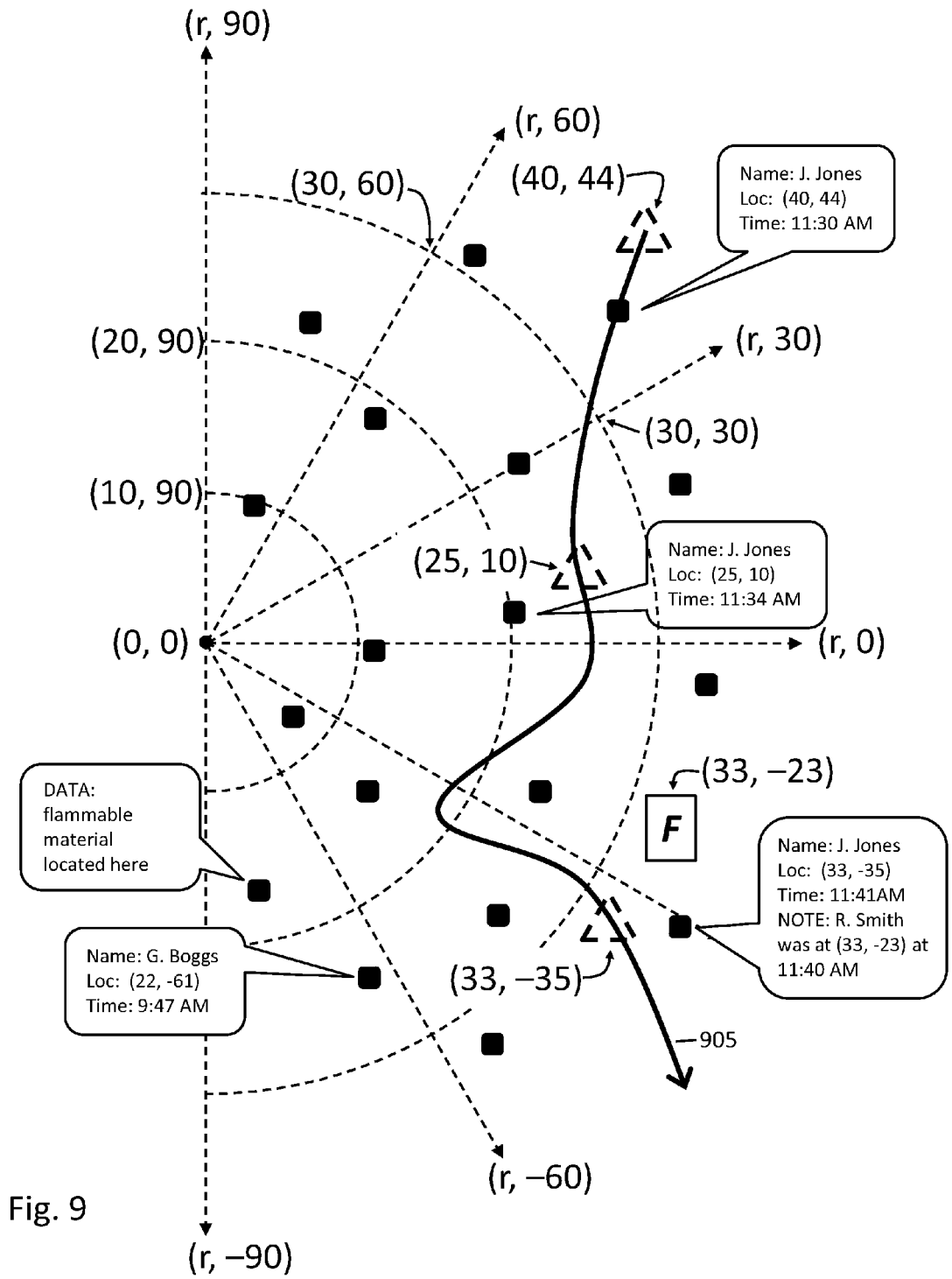
FIG. 9 illustrates a reverse RFID navigation scenario in which a mobile user stores data in (and retrieves data from) some of the tags in a set of positioning tags.

FIG. 9 illustrates a reverse RFID navigation scenario in which a mobile user stores data in (and retrieves data from) some of the tags in a set of positioning tags. In FIG. 9 positions are represented in a polar coordinate system whose origin is labeled (0,0). Other points in the system, such as (20,90) and (30,30), and axes, such as (r,0) and (r,−60), are labeled for reference. Such a coordinate system might prove convenient in a circular building, theater, orchard, or other space. If (0,0) coincides with the entrance to a building, for example, then the distance from a point (r,θ) to the entrance is r. If three dimensional positioning is needed, the polar coordinate system may be easily extended to cylindrical (r,θ,z) or spherical (r,θ,φ) coordinates.

Consider a person following path 905 and equipped with a mobile RFID reader (e.g. of the type shown in FIGS. 4A and 4B). At 11:30 AM the person was a position (40,44) as marked by a dashed triangle. Later at 11:34 AM he was at position (25,10) also marked by a dashed triangle. Finally, at 11:41 AM he was at position (33,−35) also marked by a dashed triangle.

The person may write data in tags as he passes nearby. This may be done at the person's request or automatically with no need for action by the person. In FIG. 9, the position reports just mentioned are stored in tags located at (35,40), (20,4), and (36,−31). For example, the following data is stored in the tag at (20,4): "Name: J. Jones, Loc: (25,10), Time: 11:34 AM". These position reports may be read by other readers who later pass near the tag in which they are stored. They may also be used as electronic breadcrumbs if the person that left the reports wants to retrace his steps.

The person following path 905 may encounter other, non-positioning tags, during his travels. For example, he may read tag "F" located at (33,−23). This tag could be located on another person who may or may not also have his own reader. In FIG. 9, the person following path 905 writes the following data into the tag located at (36,−31): "Name: J. Jones, Loc: (33,−35), Time: 11:41 AM, NOTE: R. Smith was at (33,−23) at 11:40 AM". The second part of the message ("NOTE: R . . . ") contains data obtained from tag "F". In this case, tag "F" is attached to firefighter R. Smith. Thus the person following path 905 may pick up data from tags and also write data to tags. He may determine the position of other mobile tags starting from his reverse RFID-derived position.

Data tags may be mobile (e.g. tag "F") or fixed. The fixed tag at (25,−63) stores information indicating the position of a person who was near the tag at 9:47 AM. The fixed tag at (17,−79) contains the information: "flammable material located here". Clearly, there is no limit to the different types of information that may be stored in tags.

A reverse RFID location system provides a useful means of navigation indoors or in other situations when GNSS satellites are obscured. The system does not require communication with a database of RFID tag ID numbers. The system is well suited for first responders navigating in low visibility indoors, but is also suited for many other applications. For example tags may be deployed to mark points to help blind people find their way or to guide robots and other vehicles.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A system comprising:
   a set of radio frequency identification tags, each tag storing its position in a fixed coordinate system; and,
   a radio frequency identification tag reader that estimates its position in the fixed coordinate system based on the positions of tags in the set as reported by the tags to the reader;
   wherein each tag encodes its position in data bits, and data bits representing the position of a tag along a first axis of the coordinate system are interleaved with data bits representing the position of the tag along a second axis of the coordinate system, and,
   the reader solicits replies from tags in progressively smaller volumes of space by: (1) requesting that only tags whose first N interleaved bits match a certain bit pattern respond; and, (2) increasing N on subsequent queries.

2. The system of claim 1 wherein one or more tags store data representing the direction to a location.

3. The system of claim 1 wherein one or more tags store data representing the distance to a location.

4. The system of claim 1 wherein one or more tags store data representing information supplied by a sensor associated with a tag.

5. The system of claim 1 wherein one or more tags store data representing a map.

6. The system of claim 1 wherein one or more tags store data representing a hazard.

7. The system of claim 6 wherein the data represents information in the National Fire Protection Agency Hazard Identification format.

8. The system of claim 1 wherein one or more tags are attached to objects chosen from the list consisting of: ceiling tiles, carpets, sprinkler heads, embedded in construction materials, switch plates.

9. The system of claim 1 wherein the reader writes data to one or more tags.

10. The system of claim 9 wherein the data written by the reader comprises the reader's position.

11. The system of claim 1 wherein the reader comprises a user interface.

12. The system of claim 11 wherein the interface comprises an audio input device.

13. The system of claim 11 wherein the interface comprises an audio output device.

14. The system of claim 11 wherein the interface comprises a display.

15. The system of claim 11 wherein the reader indicates its position.

16. The system of claim 11 wherein the reader indicates the direction to a location.

17. The system of claim 11 wherein the reader indicates the distance to a location.

18. The system of claim 11 wherein the interface comprises a tactile device.

19. The system of claim 1 wherein the reader estimates its position by assuming that the reader is at a position reported by a radio frequency identification tag.

20. The system of claim 1 wherein the reader estimates its position by assuming that the reader is at a position reported by the radio frequency identification tag having the greatest return signal strength of all such tags detected by the reader.

21. The system of claim 1 wherein the reader estimates its position by aggregating positions reported by two or more radio frequency identification tags.

22. The system of claim 21 wherein the reader estimates its position by averaging positions reported by two or more radio frequency identification tags.

23. The system of claim 21 wherein the reader estimates its position by performing a weighted average of positions reported by two or more radio frequency identification tags.

24. The system of claim 23 wherein the average is weighted by a function of signal strength returned by each tag in the average.

25. The system of claim 21 wherein the reader estimates its position based on the median of positions of tags reported by the tags to the reader.

26. The system of claim 1 wherein the reader estimates its position based on the positions of tags reported by the tags to the reader more recently than a set time threshold ago.

27. The system of claim 26 wherein the time threshold is one second.

* * * * *